US012576944B2

(12) United States Patent
 Sie

(10) Patent No.: US 12,576,944 B2
(45) Date of Patent: Mar. 17, 2026

(54) BICYCLE SHOCK ABSORBER STRUCTURE AND BICYCLE

(71) Applicant: GIANT MANUFACTURING CO., LTD., Taichung City (TW)

(72) Inventor: Zong-Han Sie, Taichung City (TW)

(73) Assignee: GIANT MANUFACTURING CO., LTD., Taichung City (TW)

( * ) Notice: Subject to any disclaimer, the term of this patent is extended or adjusted under 35 U.S.C. 154(b) by 507 days.

(21) Appl. No.: 18/347,576

(22) Filed: Jul. 6, 2023

(65) Prior Publication Data

US 2024/0010297 A1 Jan. 11, 2024

(30) Foreign Application Priority Data

Jul. 6, 2022 (TW) .................................. 111125291

(51) Int. Cl.
 *B62K 25/28* (2006.01)
(52) U.S. Cl.
 CPC .................................. *B62K 25/286* (2013.01)
(58) Field of Classification Search
 CPC ...... B62K 25/286; B62K 25/00; B62K 25/04; B62K 25/28
 See application file for complete search history.

(56) References Cited

U.S. PATENT DOCUMENTS

| | | | | |
|---|---|---|---|---|
| 8,480,064 B2 * | 7/2013 | Talavasek | ................. | F16F 9/06 280/283 |
| 9,273,746 B2 | 3/2016 | Chen et al. | | |
| 9,593,736 B2 | 3/2017 | Jordan et al. | | |
| 11,040,754 B2 * | 6/2021 | Lynch | ................... | F16F 13/007 |
| 11,312,446 B2 * | 4/2022 | Walthert | ................ | F16F 9/062 |
| 2009/0267316 A1 | 10/2009 | Gonzalez et al. | | |
| 2018/0313423 A1 | 11/2018 | Laird | | |

FOREIGN PATENT DOCUMENTS

| | | |
|---|---|---|
| CN | 1958386 A | 5/2007 |
| EP | 3546788 B1 | 4/2022 |
| TW | 512801 U | 12/2002 |
| TW | M498153 U | 4/2015 |
| TW | 201930126 A | 8/2019 |

* cited by examiner

*Primary Examiner* — Alentin Neacsu

*Assistant Examiner* — Michael R Stabley

(74) *Attorney, Agent, or Firm* — CKC & Partners Co., LLC

(57) ABSTRACT

A bicycle shock absorber structure includes a gas-tube housing, a lid, an axial rod, and a ring-shaped pad. The lid includes a locking part and a locking slot. The locking slot is disposed on the locking part. The axial rod is connected to the locking part along an axis direction. The ring-shaped pad includes a radial opening, an inner hole, and a protrusion part. The inner hole is communicated with the radial opening and for sleeving on the locking part. The protrusion part is disposed at an inner edge of the inner hole. The ring-shaped pad sleeves on the axial rod through the radial opening and moves to sleeve on the locking part. The protrusion part then protrudes into the locking slot. The ring-shaped pad is rotated relative to the lid such that an interference between the protrusion part and the locking slot is generated.

12 Claims, 7 Drawing Sheets

100

100

X $\longrightarrow$

150

110

120

128

400

420

410

414

440

430

412

420

BICYCLE SHOCK ABSORBER STRUCTURE AND BICYCLE

RELATED APPLICATIONS

This application claims priority to Taiwan Application Serial Number 111125291, filed Jul. 6, 2022, which is herein incorporated by reference.

BACKGROUND

Technical Field

The present disclosure relates to a bicycle shock absorber structure and a bicycle. More particularly, the present disclosure relates to a bicycle shock absorber structure and a bicycle with adjustable damping.

Description of Related Art

Bicycles have a wide range of user groups and application. In addition to transportation, more and more people regard cycling as a leisure or competitive activity. In order to enable different types of cyclists to ride their bicycles comfortably, different types of bicycle shock absorbers were developed. At the same time, in response to different road sections that may have different smoothness, bicycle shock absorbers with adjustable damping have also been developed. After that, shock absorbers that the initial volume of the air chamber can be adjusted through the pad according to the weight of different riders appear, but how to easily adjust and replace the pad has not been satisfied.

In the conventional method for adjusting the initial volume of the air chamber of the shock absorber, a pad can be added in the air chamber, thereby adjusting the volume of the air chamber to control the air pressure curve of the air spring for fitting to the rider's weight. In order to achieve a stable shock-absorbing effect, the pad and other parts need to be tightly engaged, which may cause difficulty for the user to install or remove the pad. Therefore, how to make the adjustment function of the air pressure curve of the bicycle shock absorber easy to be performed through the improvement of the structure is a problem to be solved in the art.

SUMMARY

According to one aspect of the present disclosure, a bicycle shock absorber structure includes a gas-tube housing, a lid, an axial rod and a ring-shaped pad. The lid covers the gas-tube housing. An inner space is defined between the lid and the gas-tube housing. The lid includes a locking part and at least one locking slot. The locking part is disposed at a side of the lid that faces toward the gas-tube housing. The at least one locking slot is disposed on the locking part. The axial rod is connected to the locking part along an axial direction. The ring-shaped pad includes a radial opening, an inner hole and at least one protrusion part. The inner hole is communicated with the radial opening and for sleeving on the locking part. The at least one protrusion part is disposed at an inner edge of the inner hole and is movable along the at least one locking slot. The ring-shaped pad sleeves on the axial rod through the radial opening and moves to sleeve on the locking part, the at least one protrusion part then protrudes into the at least one locking slot, and the ring-shaped pad is rotated relative to the lid such that an interference between the at least one protrusion part and the at least one locking slot is generated.

According to one aspect of the present disclosure, a bicycle includes a frame, two wheels disposed at the frame and the aforementioned bicycle shock absorber structure disposed at the frame.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
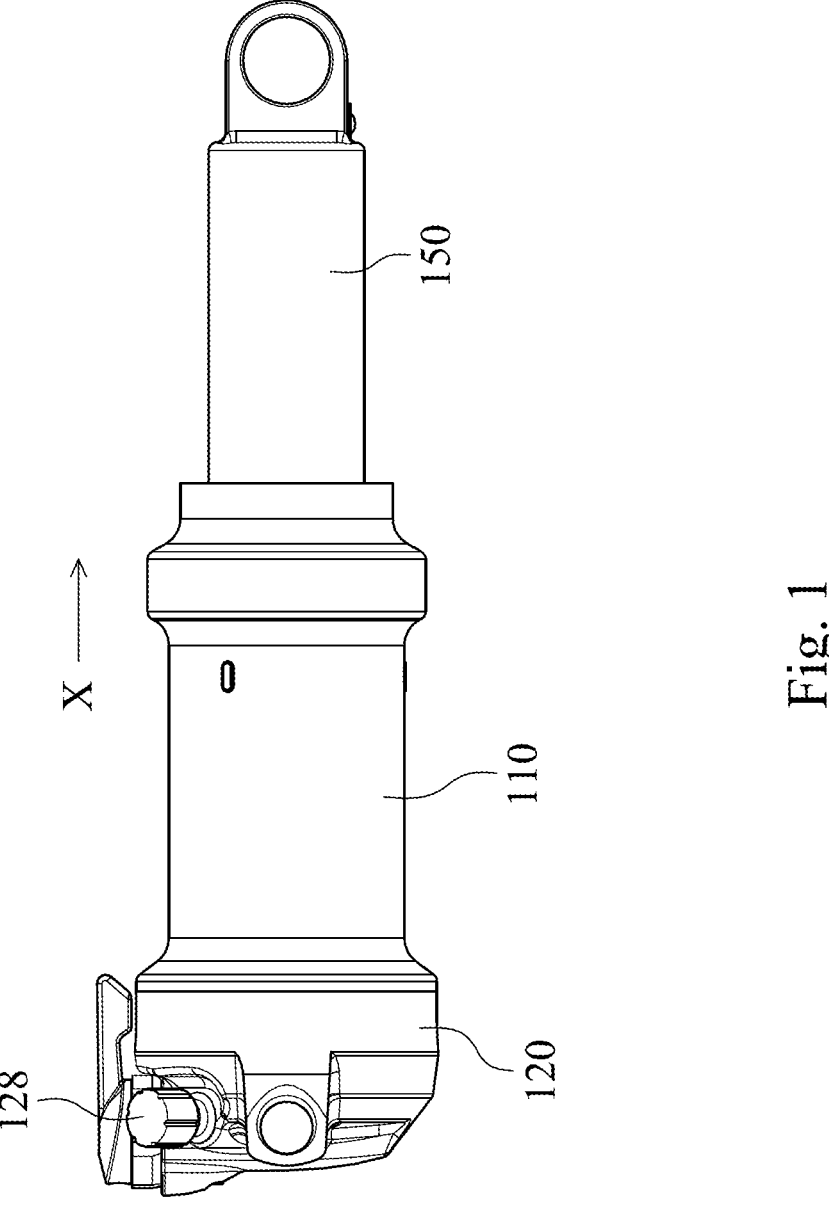
FIG. 1 is a side view of a bicycle shock absorber structure according to one embodiment of the present disclosure.
Figure 2:
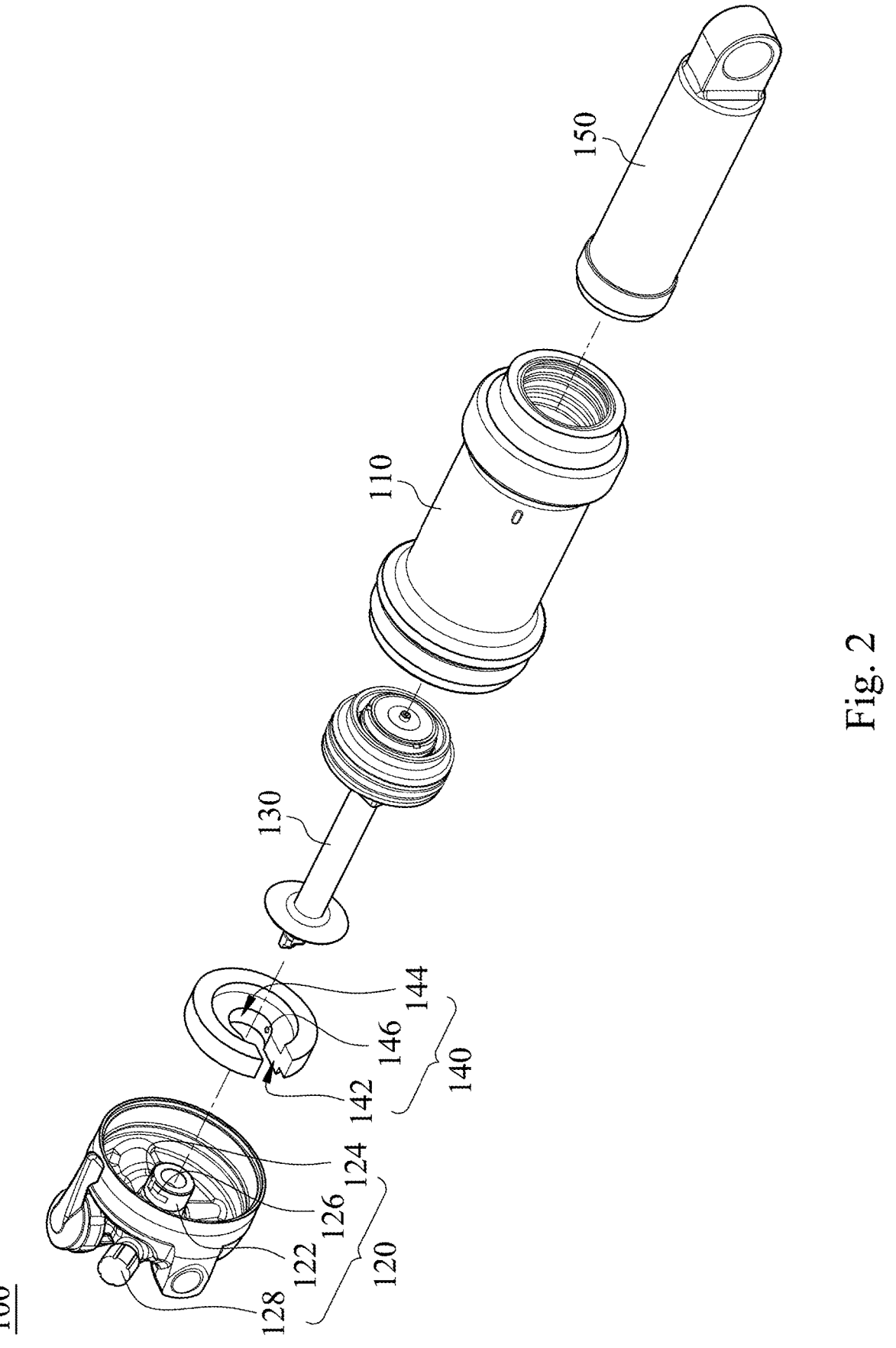
FIG. 2 is an exploded view of the bicycle shock absorber structure of FIG. 1.

FIG. 1 is a side view of a bicycle shock absorber structure 100 according to one embodiment of the present disclosure. FIG. 2 is an exploded view of the bicycle shock absorber structure 100 of FIG. 1. In FIG. 1 and FIG. 2, the bicycle shock absorber structure 100 includes a gas-tube housing 110, a lid 120, an axial rod 130 and a ring-shaped pad 140. The lid 120 covers the gas-tube housing 110. An inner space is defined between the lid 120 and the gas-tube housing 110. The lid 120 includes a locking part 122 and at least one locking slot (in the embodiment of FIG. 1, the at least one locking slot includes at least one axial restricting slot 124 and at least one circumferential restricting slot 126). The locking part 122 is disposed at a side of the lid 120 that faces toward the gas-tube housing 110. The at least one axial restricting slot 124 and the at least one circumferential restricting slot 126 are disposed on the locking part 122. The axial rod 130 is connected to the locking part 122 along an axial direction X. The ring-shaped pad 140 includes a radial opening 142, an inner hole 144 and at least one protrusion part 146. The inner hole 144 is communicated with the radial opening 142 and is for sleeving on the locking part 122. The at least one protrusion part 146 is disposed at an inner edge 145 (labeled in FIGS. 5 and 6) of the inner hole 144. Through sleeving the ring-shaped pad 140 on the locking part 122, the inner space defined between the lid 120 and the gas-tube housing 110 is tunable. Therefore, the damping curve of the bicycle shock absorber structure 100 can be adjusted.

The bicycle shock absorber structure 100 of this disclosure can be a single-barrel shock absorber, a dual-barrel shock absorber, etc. In the embodiment of FIG. 1, the bicycle shock absorber structure 100 further includes an inner-tube housing 150 connected to the gas-tube housing 110. The inner-tube housing 150 moves along the axial direction X relative to the gas-tube housing 110. The inner structure and the principle of the bicycle shock absorber structure 100 are known and are not the main improvement of this disclosure, and therefore are not described again.

Figures 3, 4:
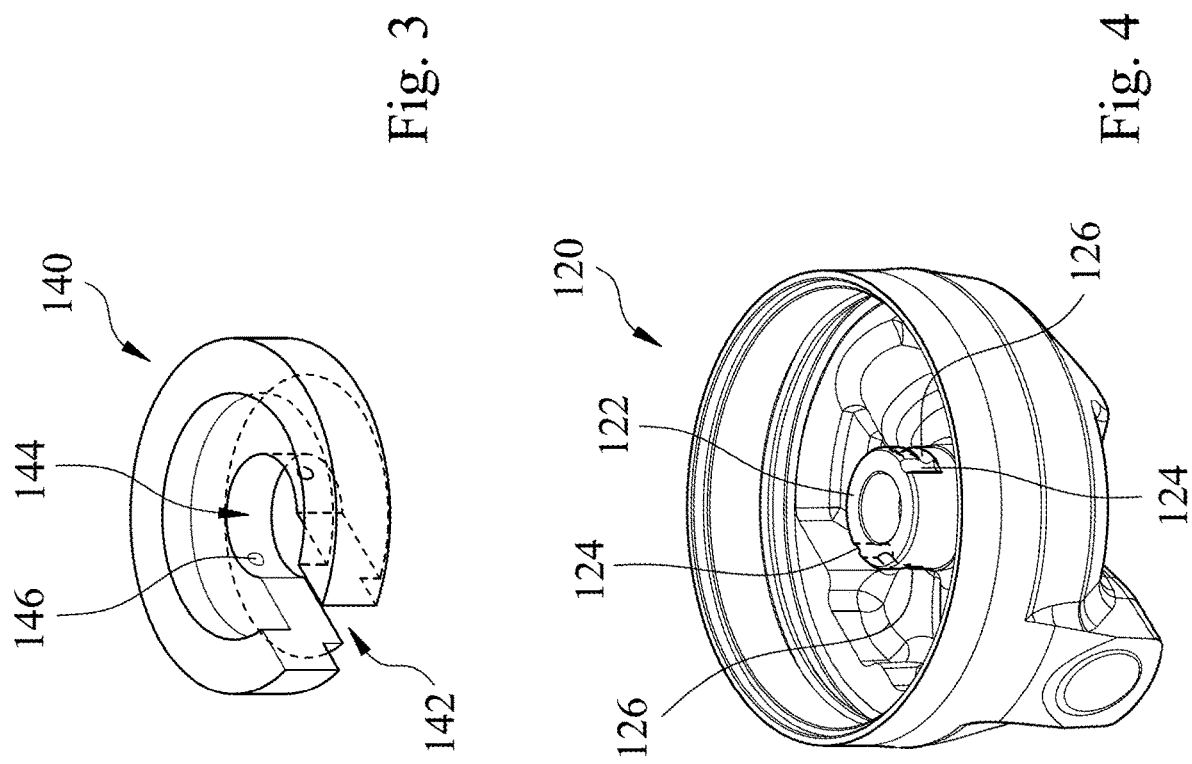
FIG. 3 is a three dimensional view of a ring-shaped pad of the bicycle shock absorber structure of FIG. 1.
FIG. 4 is a three dimensional view of a lid of the bicycle shock absorber structure of FIG. 1.

The lid 120 and the ring-shaped pad 140 of this embodiment are described in detail below. Please refer to FIG. 3 and FIG. 4. FIG. 3 is a three dimensional view of a ring-shaped pad 140 of the bicycle shock absorber structure 100 of FIG. 1. FIG. 4 is a three dimensional view of a lid 120 of the bicycle shock absorber structure 100 of FIG. 1. In this embodiment, the locking part 122 has a cylinder structure. A number of the at least one locking slot is two and the two locking slots are disposed oppositely. As shown in FIG. 4, a number of the at least one axial restricting slot 124 is two and the two axial restricting slots 124 are disposed oppositely. A number of the at least one circumferential restricting slot 126 is two and the two circumferential restricting slots 126 are disposed oppositely. The ring-shaped pad 140 has a C-shaped structure. The inner diameter of the radial opening 142 is smaller than the inner diameter of the inner hole 144. A number of the at least one protrusion part 146 is two and the two protrusion parts 146 are disposed oppositely. In FIGS. 3 and 4, one of the circumferential restricting slots 126 is communicated with one of the axial restricting slot 124, and the other one of the circumferential restricting slots 126 is communicated with the other one of the axial restricting slot 124. The shape and size of the protrusion part 146 match the width of the axial restricting slot 124 and the width of the circumferential restricting slot 126 such that the protrusion part 146 is movable along the axial restricting slot 124 and the circumferential restricting slot 126. In this embodiment, the surface of the protrusion part 146, the surface of the axial restricting slot 124 and the surface of the circumferential restricting slot 126 are curved. Through the curved surfaces of the protrusion part 146, the axial restricting slot 124 and the circumferential restricting slot 126, the protrusion part 146 is easier to move in the axial restricting slot 124 and the circumferential restricting slot 126.

In addition, in the embodiment of FIGS. 1 to 4, the protrusion part 146 can be integrally formed on the inner edge 145 (labeled in FIGS. 5 and 6) of the inner hole 144. For example, the protrusion part 146 of a rubber material can be formed integrally on the inner edge 145 of the inner hole 144 of the ring-shaped pad 140 of a rubber material such that no structural interface exists between the protrusion part 146 and the inner edge 145 of the inner hole 144. The ring-shaped pad 140 can be made of any elastic material and is not limited to rubber. Otherwise, in other embodiments, the protrusion part can have a steel bead structure and be fixed on the inner edge of the inner hole. Otherwise, in other embodiments, the ring-shaped pad can be made of rigid material (e.g. metal) and is not elastic while an elastic protrusion part can be used.

Figure 5:
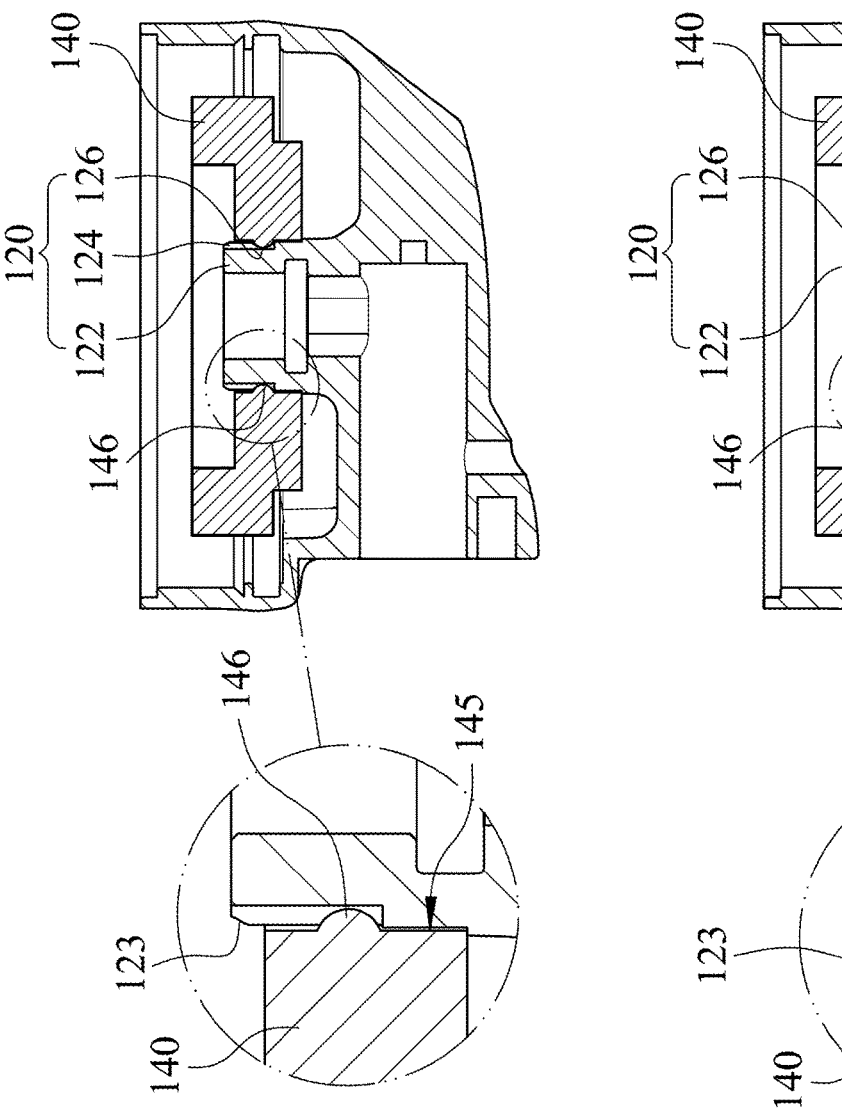
FIG. 5 is one cross sectional view of the lid assembled with the ring-shaped pad of the bicycle shock absorber structure of FIG. 1.
Figure 6:
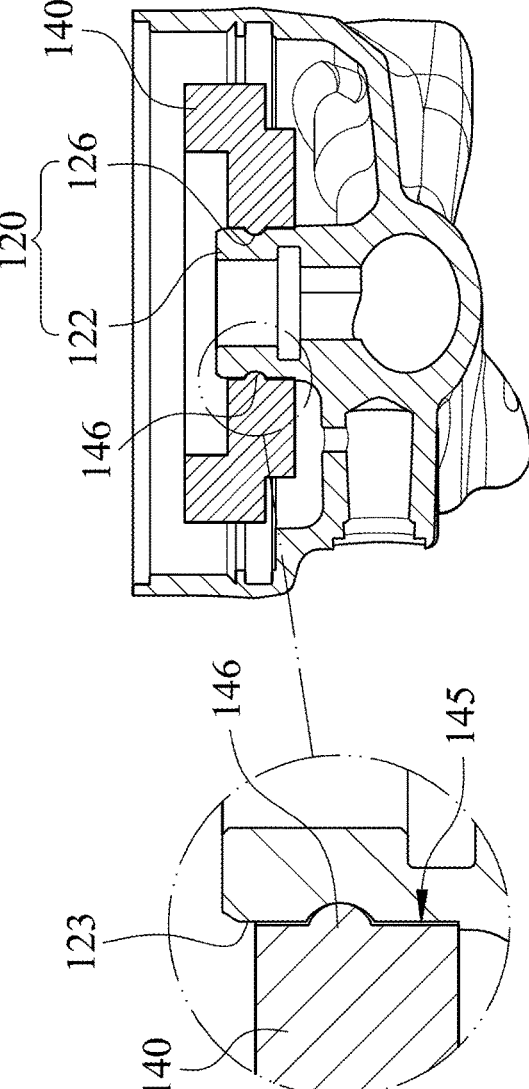
FIG. 6 is another cross sectional view of the lid assembled with the ring-shaped pad of the bicycle shock absorber structure of FIG. 1.

Please refer to FIGS. 2, 5 and 6. The installing method of the bicycle shock absorber structure 100 is described below. FIG. 5 is one cross sectional view of the lid 120 assembled with the ring-shaped pad 140 of the bicycle shock absorber structure 100 of FIG. 1. FIG. 6 is another cross sectional view of the lid 120 assembled with the ring-shaped pad 140 of the bicycle shock absorber structure 100 of FIG. 1. The ring-shaped pad 140 sleeves on the axial rod 130 through the radial opening 142 and moves along the axial direction X to sleeve on the locking part 122, the two protrusion parts 146 then protrude into the two axial restricting slots 124 respectively, and the ring-shaped pad 140 is rotated such that the two protrusion parts 146 enter the two circumferential restricting slots 126, respectively, and an interference between the protrusion parts 146 and the locking slots is generated.

In the conventional tunable shock absorber, there are no additional structures on the ring-shaped pad and the locking part for fixing, and the ring-shaped pad is simply fixed by the contact between the surface of the inner edge of the ring-shaped pad and the surface of the locking part, and a large force is required by the bicycle riders to assemble or disassemble the ring-shaped pad. Through the structure that the protrusion part 146 protrudes into the axial restricting slot 124, and the ring-shaped pad 140 is rotated such that the protrusion part 146 enters the circumferential restricting slot 126 to generate interference therebetween, the bicycle riders can assemble or separate the ring-shaped pad 140 from the lid 120 more easily, which results a easily adjusting effect.

In this embodiment, a depth of the axial restricting slot 124 is larger than a depth of the circumferential restricting slot 126. In FIGS. 5 and 6, when the protrusion part 146 of the ring-shaped pad 140 is in the axial restricting slot 124 (as shown in FIG. 5), a gap exists between the inner edge 145 of the inner hole 144 of the ring-shaped pad 140 and the surface of the axial restricting slot 124, and a gap exists between the inner edge 145 of the inner hole 144 of the ring-shaped pad 140 and the surface 123 of the locking part 122. After rotating the ring-shaped pad 140, the protrusion part 146 is in the circumferential restricting slot 126 (as shown in FIG. 6). Since the depth of the circumferential restricting slot 126 is smaller than the depth of the axial restricting slot 124, the interference is generated between the circumferential restricting slot 126 and the ring-shaped pad 140. Because the ring-shaped pad 140 is elastic, when the circumferential restricting slot 126 applies a force on the protrusion part 146, the ring-shaped pad 140 deforms near the protrusion part 146, and a restoring force makes the ring-shaped pad 140 squeeze the locking part 122. At this moment, no gap exists between the protrusion part 146 of the ring-shaped pad 140 and the surface of the circumferential restricting slot 126, and the inner edge 145 of the inner hole 144 of the ring-shaped pad 140 is close to or touches the surface 123 of the locking part 122 of the lid 120. Therefore, a user can easily sleeve the ring-shaped pad 140 on the locking part 122, and can fix the ring-shaped pad 140 on the locking part 122 by simply rotating the ring-shaped pad 140. Inverse operation may be applied to disassemble the ring-shaped pad 140.

To carry out the aforementioned function, the depth of the axial restricting slot 124 and the circumferential restricting slot 126 can be designed. In one embodiment, a ratio of the depth of the at least one axial restricting slot 124 and the depth of the at least one circumferential restricting slot 126 is in a range of 1.18 to 1.9.

In addition to tune the pressure curve of the bicycle shock absorber structure 100 by adjusting the volume of the air chamber (the inner space between the lid 120 and the gas-tube housing 110), the pressure curve of the bicycle shock absorber structure 100 can also be tuned by adjusting the vapor pressure in the air chamber. In the embodiment of FIGS. 1 to 6, the lid 120 includes a gas valve 128, and the gas valve 128 allows a gas to enter or to exit the inner space.

Figure 7:
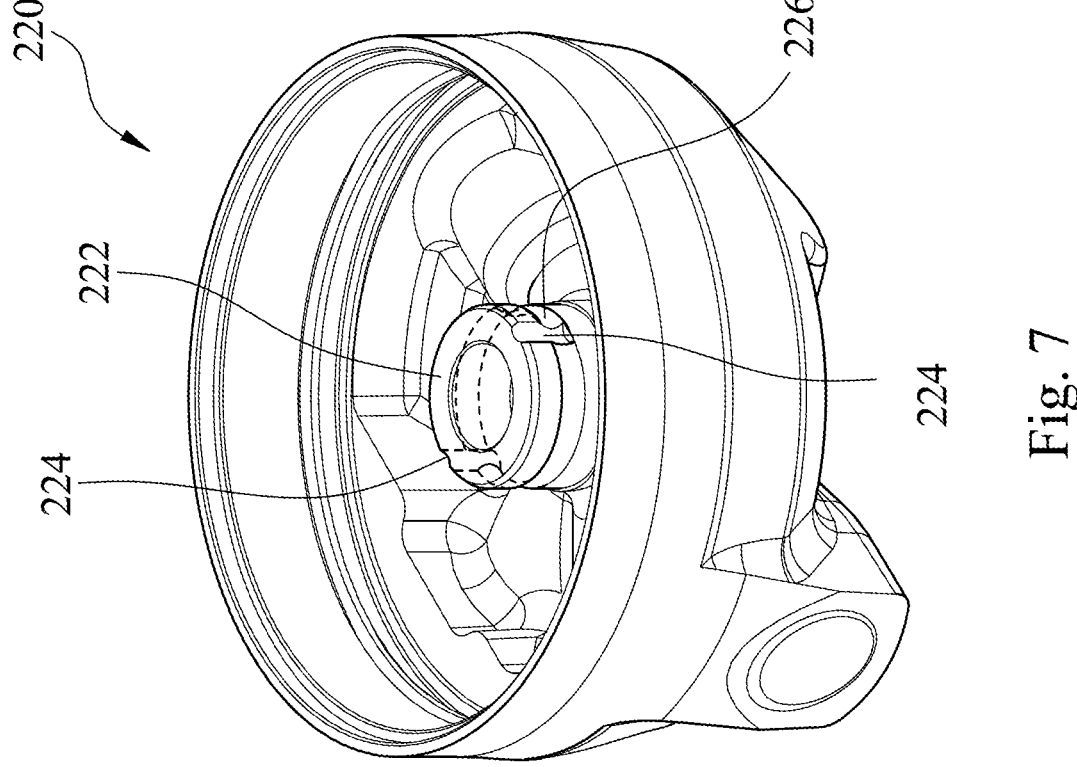
FIG. 7 is a three dimensional view of a lid of a bicycle shock absorber structure according to another embodiment of the present disclosure.

Please refer to FIG. 7. FIG. 7 is a three dimensional view of a lid 220 of a bicycle shock absorber structure according to another embodiment of the present disclosure. The lid 220 of this embodiment is similar to the lid 120 of the embodiment of FIG. 1, and the difference is that the circumferential restricting slot 226 surrounds the locking part 222 and forms a ring-shaped circumferential restricting slot 226, and is communicated with the at least one axial restricting slot 224. In the real production and application, the extending length of the circumferential restricting slot 226 along the circumferential direction R (shown in FIG. 8) of the locking part 222 can be designed according to demands.

Figure 8:
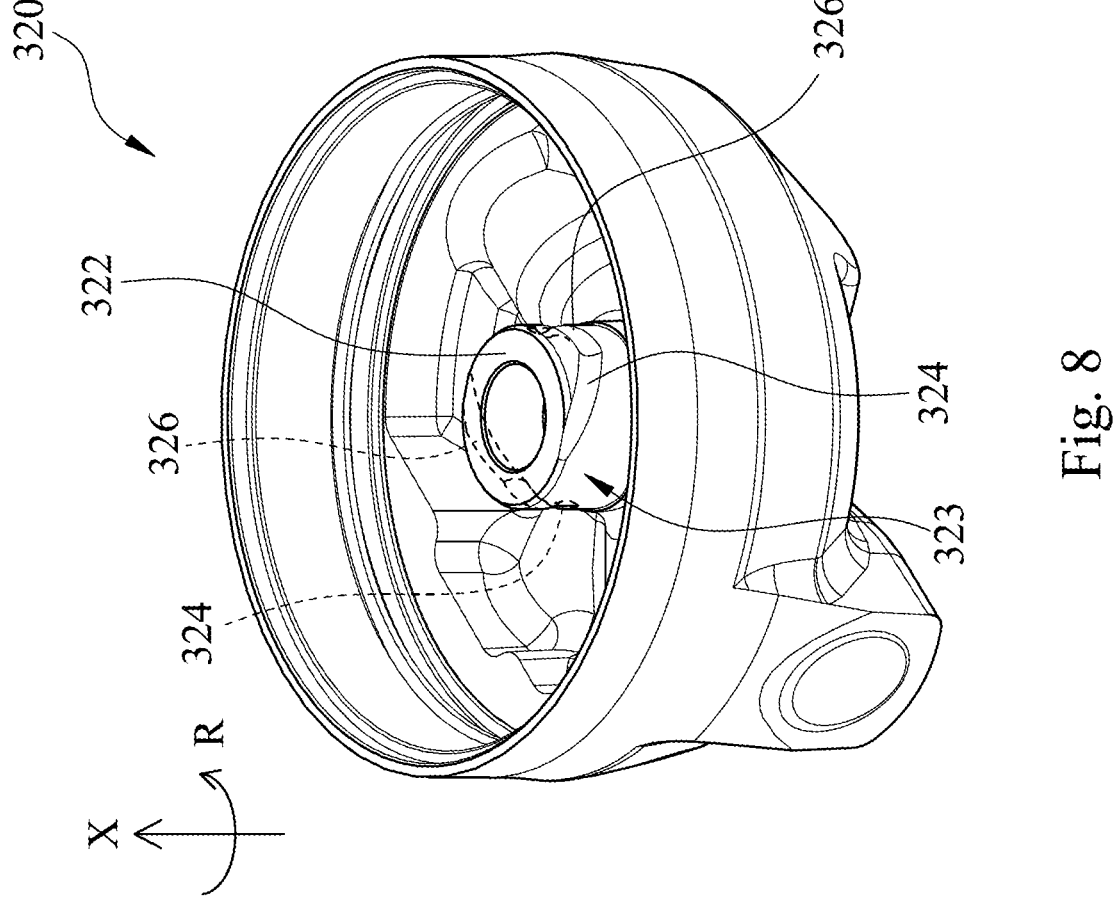
FIG. 8 is a three dimensional view of a lid of a bicycle shock absorber structure according to yet another embodiment of the present disclosure.

Please refer to FIG. 8. FIG. 8 is a three dimensional view of a lid 320 of a bicycle shock absorber structure according to yet another embodiment of the present disclosure. The lid 320 of this embodiment is similar to the lid 120 of the embodiment of FIG. 1, and the difference is that the at least one locking slot includes at least one spiral restricting slot 324. The at least one spiral restricting slot 324 extends along the axial direction X and the circumferential direction R on the surface 323 of the locking part 322. In this embodiment, the locking slot includes two spiral restricting slots 324 and two circumferential restricting slots 326. One of the spiral restricting slots 324 is communicated with one of the circumferential restricting slots 326, and the other one of the spiral restricting slots 324 is communicated with the other one of the circumferential restricting slot 326.

In the above three different embodiments, a number of the protrusion parts 146 and a number of the ring-shaped pad 140 are two, and a number of the locking slots of the lid 120, 220 and 320 is two. In other embodiments that are not illustrated in this disclosure, the ring-shaped pad can include only one protrusion part, and the lid can include only one locking slot, or the ring-shaped pad can include more than two protrusion parts, and the lid can include more than two locking slots.

Figure 9:
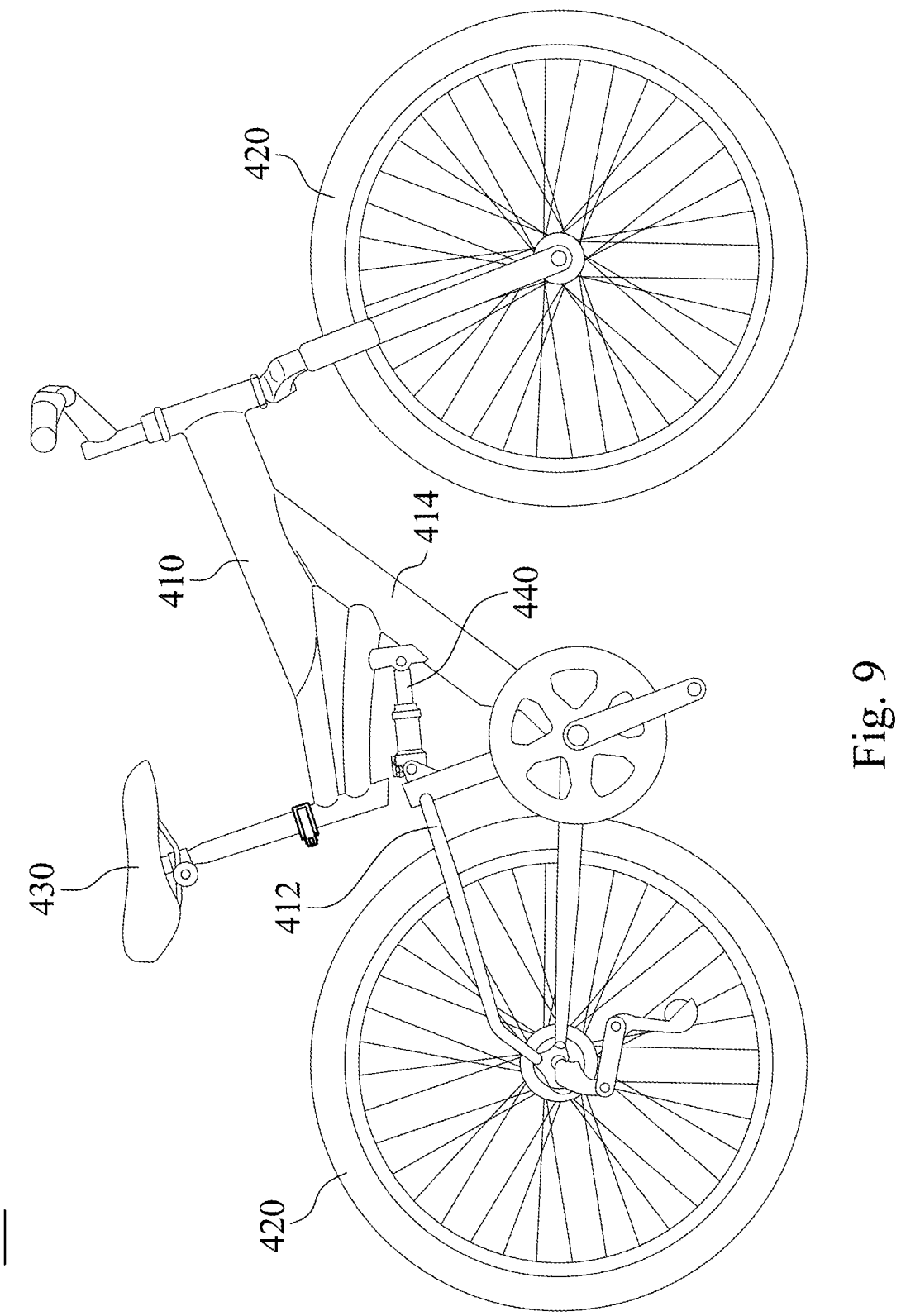
FIG. 9 is a side view of a bicycle according to still yet another embodiment of the present disclosure.

Please refer to FIG. 9. FIG. 9 is a side view of a bicycle 400 according to still yet another embodiment of the present disclosure. The bicycle shock absorber structure 440 is illustrated as a rear shock absorber in FIG. 9 to illustrate the position of the bicycle shock absorber structure 440 on bicycle 400. In FIG. 9, the bicycle 400 includes a frame 410, two wheels 420 and the bicycle shock absorber structure 440. The two wheels 420 and the bicycle shock absorber structure 440 are disposed on the frame 410. The lid and the inner-tube housing of the bicycle shock absorber structure 440 are respectively fixed at the seat stay 412 of the frame 410 and the down tube 414 of the frame 410. Through positioning the bicycle shock absorber structure 440 between the seat stay 412 and the down tube 414, the shock generated by the wheels 420 traveling on an uneven road can be partially or totally absorbed by the bicycle shock absorber structure 440 such that the vibrations of shocks transport to the saddle 430 are reduced, and comfortability of riding the bicycle 400 can be improved.

In this embodiment, the bicycle shock absorber structure 440 can be the bicycle shock absorber structure 100 in FIGS. 1 to 6. In the bicycle shock absorber structure 440, a depth of a part of the at least one locking slot closing to the axial rod is larger than a depth of another part of the at least one locking slot away from the axial rod.

In other embodiments, the bicycle shock absorber structure can be front fork shock absorber, etc., and can be disposed at different position of the bicycle, and the present disclosure is not limited thereto.

Although the present disclosure has been described in considerable detail with reference to certain embodiments thereof, other embodiments are possible. Therefore, the spirit and scope of the appended claims should not be restricted to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bicycle shock absorber structure, comprising:
a gas-tube housing;
a lid covering the gas-tube housing, an inner space being defined between the lid and the gas-tube housing, the lid comprising:
a locking part disposed at a side of the lid that faces toward the gas-tube housing; and
at least one locking slot disposed on the locking part;
an axial rod connected to the locking part along an axial direction; and
a ring-shaped pad, comprising:
a radial opening;
an inner hole communicated with the radial opening and for sleeving on the locking part; and
at least one protrusion part disposed at an inner edge of the inner hole and being movable along the at least one locking slot;
wherein the ring-shaped pad sleeves on the axial rod through the radial opening and moves to sleeve on the locking part, the at least one protrusion part then protrudes into the at least one locking slot, and the ring-shaped pad is rotated relative to the lid such that an interference between the at least one protrusion part and the at least one locking slot is generated.

2. The bicycle shock absorber structure of claim 1, wherein the at least one locking slot comprises:
at least one axial restricting slot; and
at least one circumferential restricting slot communicated with the at least one axial restricting slot.

3. The bicycle shock absorber structure of claim 2, wherein a depth of the at least one axial restricting slot is larger than a depth of the at least one circumferential restricting slot.

4. The bicycle shock absorber structure of claim 3, wherein a ratio of the depth of the at least one axial restricting slot and the depth of the at least one circumferential restricting slot is in a range of 1.18 to 1.9.

5. The bicycle shock absorber structure of claim 2, wherein a surface of the at least one protrusion part, a surface of the at least one axial restricting slot and a surface of the at least one circumferential restricting slot are curved.

6. The bicycle shock absorber structure of claim 1, wherein the at least one locking slot comprises at least one spiral restricting slot.

7. The bicycle shock absorber structure of claim 1, wherein the at least one protrusion part has a steel bead structure.

8. The bicycle shock absorber structure of claim 1, wherein a number of the at least one locking slot is larger than or equal to 2.

9. The bicycle shock absorber structure of claim 1, wherein the lid comprises a gas valve, and the gas valve allows a gas to enter or to exit the inner space.

10. The bicycle shock absorber structure of claim 1, further comprising:
an inner-tube housing connected to the gas-tube housing, the inner-tube housing moving along the axial direction relative to the gas-tube housing.

7

8

11. A bicycle, comprising:

a frame;

two wheels disposed at the frame; and the bicycle shock absorber structure of claim 1 disposed at the frame.

12. The bicycle of claim 11, wherein a depth of a part of the at least one locking slot close to the axial rod is larger than a depth of another part of the at least one locking slot away from the axial rod.

* * * * *